US012413017B2

(12) United States Patent

Morello et al.

(10) Patent No.: US 12,413,017 B2
(45) Date of Patent: Sep. 9, 2025

(54) ELECTRICAL CONNECTOR WITH TERMINAL RETAINER AND METHOD FOR MANUFACTURING SAME

(71) Applicant: Aptiv Technologies AG, Schaffhausen (CH)

(72) Inventors: John Morello, Warren, OH (US); James M. Rainey, Warren, OH (US); Steven P. Ragalyi, Cortland, OH (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 328 days.

(21) Appl. No.: 18/119,341

(22) Filed: Mar. 9, 2023

(65) Prior Publication Data

US 2023/0307873 A1 Sep. 28, 2023

Related U.S. Application Data

(60) Provisional application No. 63/324,194, filed on Mar. 28, 2022.

(51) Int. Cl.

*H01R 13/639* (2006.01)
*H01R 13/436* (2006.01)
*H01R 13/52* (2006.01)
*H01R 13/641* (2006.01)

(52) U.S. Cl.

CPC ....... *H01R 13/639* (2013.01); *H01R 13/4362* (2013.01); *H01R 13/5202* (2013.01); *H01R 13/641* (2013.01)

(58) Field of Classification Search

None

See application file for complete search history.

(56) References Cited

U.S. PATENT DOCUMENTS 3,028,575 A * 4/1962 Lazar .................. H01R 13/434 428/592
3,390,376 A * 6/1968 Nava .................... H01R 13/426 439/871
5,934,945 A * 8/1999 Petersen .............. H01R 13/426 439/744
7,530,843 B1 * 5/2009 Tesfay ................. H01R 13/521 439/587
8,758,035 B2 6/2014 Morello et al.
10,903,599 B2 * 1/2021 Lienert ................ H02G 15/013
11,063,386 B2 * 7/2021 Itou ...................... H01R 13/506

FOREIGN PATENT DOCUMENTS

WO WO-2012163777 A1 * 12/2012 ........... H01R 13/506

* cited by examiner

*Primary Examiner* — Tho D Ta

(74) *Attorney, Agent, or Firm* — Billion & Armitage

(57) ABSTRACT

An electrical connector includes an integrally formed cylindrical housing and a cylindrical spring lock retainer disposed within a cavity in the housing and defining a spring member and a terminal lock. The electrical connector further includes an annular ridge protruding from inner walls of the housing into the cavity and a plurality of spring lock retainer stops extending from the inner walls into the cavity and arranged around a circumference of the spring lock retainer. The annular ridge is arranged on a first end of the spring lock retainer and the plurality of spring lock retainer stops are arranged on a second end of the spring lock retainer opposite the first end. A method of manufacturing such an electrical connector is also presented.

18 Claims, 11 Drawing Sheets

ELECTRICAL CONNECTOR WITH TERMINAL RETAINER AND METHOD FOR MANUFACTURING SAME

CROSS-REFERENCE TO RELATED APPLICATION

This application claims benefit of priority to U.S. Provisional Application No. 63/324,194 filed on May 28, 2022, the entire disclosure of which is hereby incorporated by reference.

TECHNICAL FIELD

This invention generally relates to an electrical connector with a terminal retainer.

BACKGROUND

Existing electrical connectors may require multi-piece plastic insulative housings in order to securely hold a terminal within the housing. Other existing sealed electrical connectors having a one-piece housing may require multiple sealing interfaces and/or may be unrepairable, i.e., terminals in the connectors may not be removed and replaced if damaged.

SUMMARY

This patent application is directed to electrical connector having a terminal secured by a spring lock retainer within a one-piece integrally formed connector housing. In addition, the terminal may be removed and repaired though use of a removal tool.

According to one or more aspects of the present disclosure, an electrical connector includes an integrally formed cylindrical housing, a cylindrical spring lock retainer disposed within a cavity in the housing and defining a spring member and a terminal lock, an annular ridge protruding from inner walls of the housing into the cavity and a plurality of spring lock retainer stops extending from the inner walls into the cavity and arranged around a circumference of the spring lock retainer. The annular ridge is arranged on a first end of the spring lock retainer and the plurality of spring lock retainer stops are arranged on a second end of the spring lock retainer opposite the first end.

In one or more embodiments of the electrical connector according to the previous paragraph, the plurality of spring lock retainer stops is cold formed by deforming grooved portions of the inner walls.

In one or more embodiments of the electrical connector according to any one of the previous paragraphs, the housing is formed of a cold formable polymer material.

In one or more embodiments of the electrical connector according to any one of the previous paragraphs, the inner walls define a longitudinal ridge that is received within a slot in the spring lock retainer.

In one or more embodiments of the electrical connector according to any one of the previous paragraphs, edges of the slot define a plurality of barbs in an interference fit with the longitudinal ridge.

In one or more embodiments of the electrical connector according to any one of the previous paragraphs, the spring lock retainer defines a plurality of retention barbs that extend outwardly from the spring lock retainer and are configured to be in an interference fit with the inner walls.

In one or more embodiments of the electrical connector according to any one of the previous paragraphs, the annular ridge is a first annular ridge. The electrical connector further includes a second annular ridge protruding from the inner walls of the housing into the cavity that is arranged on the second end of the spring lock retainer. A height of the second annular ridge is less than a height of the first annular ridge.

In one or more embodiments of the electrical connector according to any one of the previous paragraphs, the electrical connector also includes a pair of locating grooves in the inner walls located opposite one another and configured to allow a tool to push the spring lock retainer into proximity with the annular ridge.

In one or more embodiments of the electrical connector according to any one of the previous paragraphs, the electrical connector additionally includes a cable terminated by a terminal having a plurality of annular ridges received within the spring lock retainer. The terminal lock engages one of the annular ridges in the plurality of annular ridges. The spring member and the terminal lock cooperate to retain a terminal within the cavity.

In one or more embodiments of the electrical connector according to any one of the previous paragraphs, the electrical connector further incorporates an annular cable seal surrounding the cable and disposed within the cavity and a seal retainer disposed within the cavity. The cable seal and the seal retainer cooperate to maintain engagement of the terminal lock with the annular ridge.

According to one or more aspects of the present disclosure, a method of manufacturing an electrical connector includes the steps of:

- inserting a cylindrical spring lock retainer defining a spring member and a terminal lock within a cavity in an integrally formed cylindrical housing;
- pushing the spring lock retainer into proximity of an annular ridge protruding from inner walls of the housing into the cavity; and
- forming a plurality of spring lock retainer stops extending from the inner walls into the cavity by deforming the inner walls using a cold forming process.

The annular ridge is arranged on a first end of the spring lock and the plurality of spring lock retainer stops are arranged on a second end of the spring lock retainer opposite the first end.

In one or more embodiments of the method according to the previous paragraph, forming the plurality of spring lock retainer stops further includes deforming grooved portions of the inner walls.

In one or more embodiments of the method according to any one of the previous paragraphs, the housing is formed of a cold formable polymer material.

In one or more embodiments of the method according to any one of the previous paragraphs, the plurality of spring lock retainer stops are formed in a temperature range of about 20° C. to 25° C.

In one or more embodiments of the method according to any one of the previous paragraphs, the plurality of spring lock retainer stops are formed by a tool having a concave forming surface.

In one or more embodiments of the method according to any one of the previous paragraphs, the method further includes the steps of:

- aligning a slot in the spring lock retainer with a longitudinal ridge projecting into the cavity; and
- receiving the longitudinal ridge within the slot as the spring lock retainer is pushed into proximity of the annular ridge.

In one or more embodiments of the method according to any one of the previous paragraphs, edges of the slot have a plurality of retention barbs. The method also includes the step of placing the plurality of barbs in an interference fit with the longitudinal ridge as the spring lock retainer is pushed into proximity of the annular ridge.

In one or more embodiments of the method according to any one of the previous paragraphs, the spring lock retainer defines a plurality of retention barbs that extend outwardly from the spring lock retainer. The method additionally includes the step of placing the plurality of retention barbs in an interference fit with the inner walls as the spring lock retainer is pushed into proximity of the annular ridge.

In one or more embodiments of the method according to any one of the previous paragraphs, the step of pushing the spring lock retainer into proximity of the annular ridge protruding from inner walls of the housing into the cavity further includes disposing a tool in a pair of locating grooves in the inner walls located opposite one another and pushing the tool until it is stopped by end walls of the locating grooves, thereby pushing the spring lock retainer into proximity with the annular ridge.

In one or more embodiments of the method according to any one of the previous paragraphs, the method also includes the steps of:

- inserting a cable terminated by a terminal having a plurality of annular ridges within the spring lock retainer at an acute angle to a longitudinal axis of the spring lock retainer until the terminal lock engages one of the annular ridges in the plurality of annular ridges; and
- arranging the terminal and cable parallel to the longitudinal axis of the spring lock retainer, thereby retaining the terminal within the cavity via cooperation of the terminal lock and the spring member.

In one or more embodiments of the method according to any one of the previous paragraphs, the method also includes the steps of:

- inserting the cable within an annular cable seal surrounding the cable;
- disposing the cable seal within the cavity; and
- inserting a seal retainer within the cavity.

The cable seal and seal retainer cooperate to maintain the parallel arrangement of the terminal and cable with the longitudinal axis of the spring lock retainer.

BRIEF DESCRIPTION OF THE DRAWINGS

The present invention will now be described, by way of example with reference to the accompanying drawings, in which.

DETAILED DESCRIPTION

Figure 1:
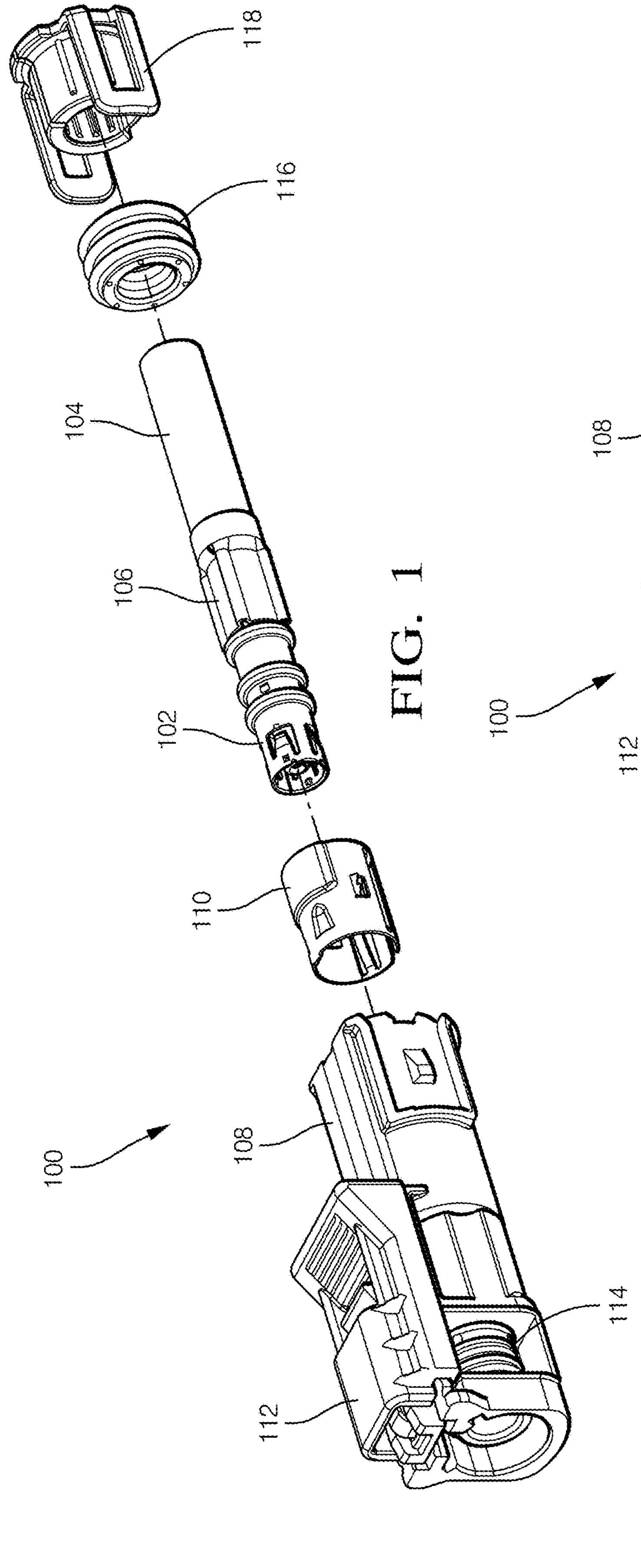
FIG. 1 shows an exploded view of an electrical connector according to some embodiments.
Figure 2:
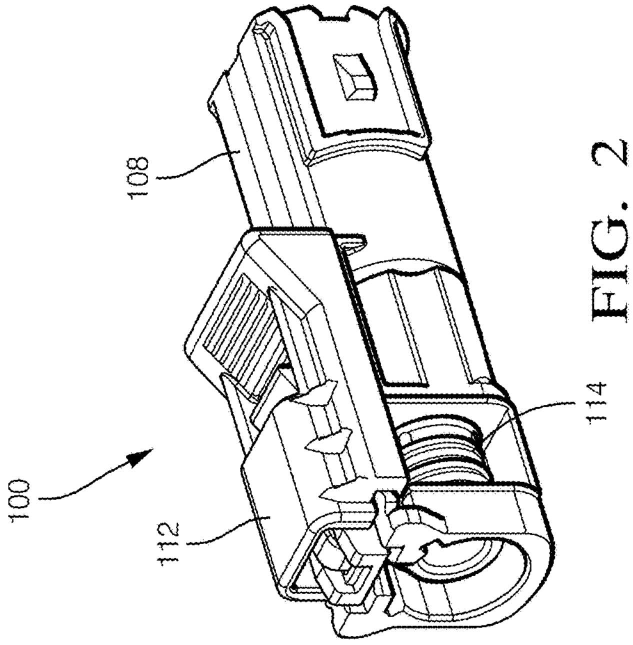
FIG. 2 shows an assembled view of the electrical connector of FIG. 1 according to some embodiments.

FIGS. 1 and 2 illustrate a non-limiting example of an electrical connector in the form of a coaxial electrical connector, hereafter referred to as the connector 100. The connector 100 includes a coaxial electrical terminal 102 connected to a coaxial electrical cable 104 by a ferrule 106. While the illustrated example shows a coaxial terminal 102 and coaxial cable 104, other embodiments may be envisioned using other electrical terminal and cable types. The terminal 102 is secured within a connector housing 108 by a spring lock retainer 110. The connector housing further includes a connector position assurance (CPA) device 112 configured to verify and maintain a locked condition between the connector 100 and a corresponding mating connector (not shown). The connector housing is integrally formed, i.e., it is a single piece unitary construction. The illustrated connector is a sealed coaxial electrical connector and includes a terminal seal 114, a cable seal 116, and a cable seal retainer 118. Other embodiments of the connected may not be sealed and would not include the terminal seal 114, the cable seal 116, or the cable seal retainer 118.

Figure 3:
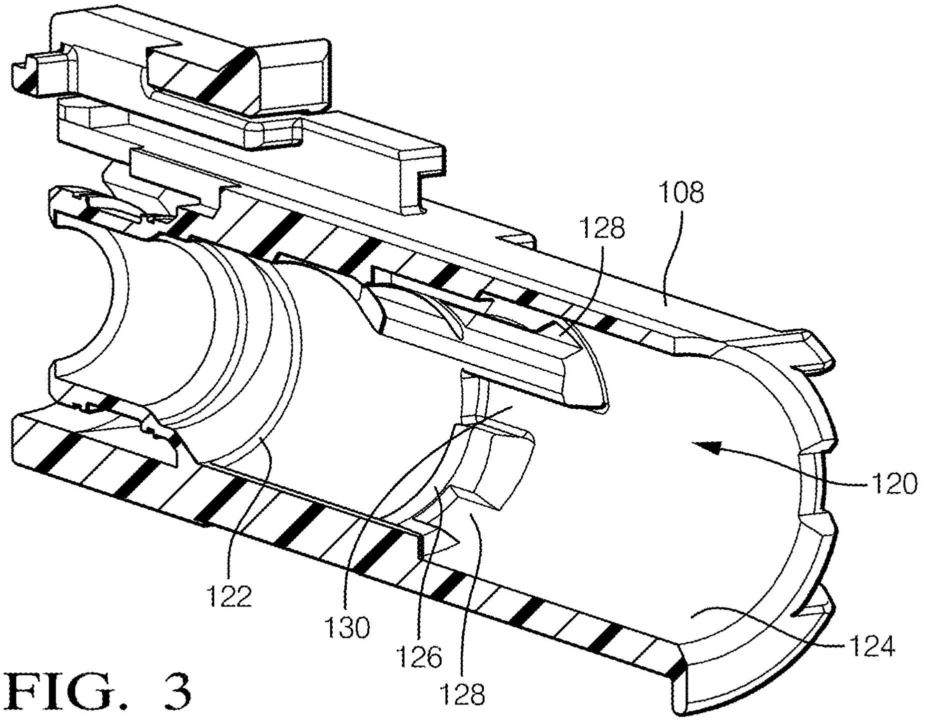
FIG. 3 shows a cross-section view of a connector housing according to some embodiments.
Figure 4:
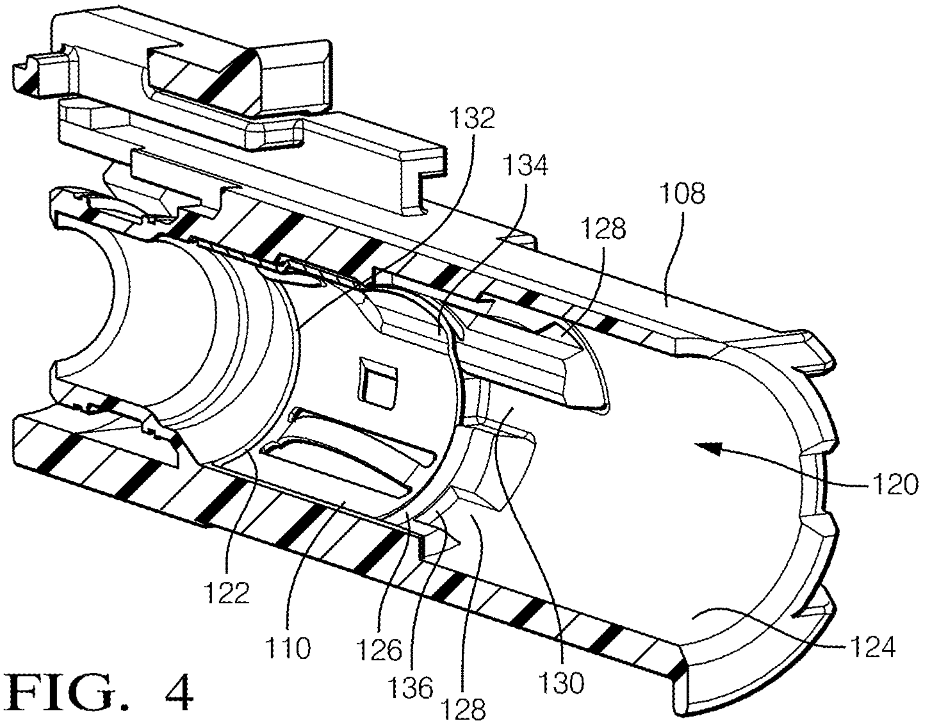
FIG. 4 shows a cross-section view of the connector housing of FIG. 3 after insertion of a spring lock retainer but prior to forming spring lock retainer stops according to some embodiments.
Figure 5:
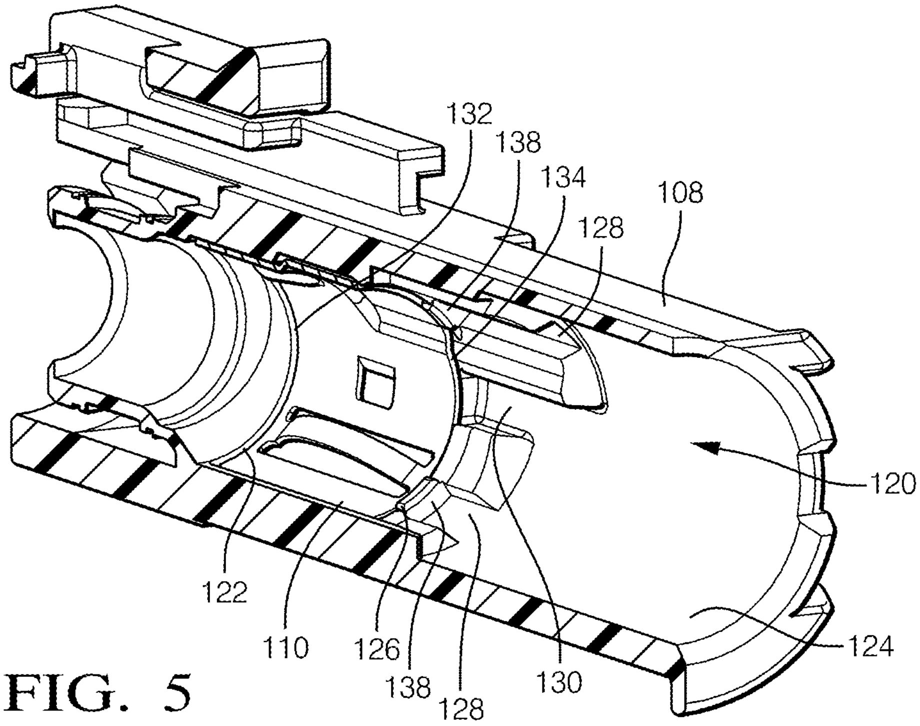
FIG. 5 shows a cross-section view of the connector housing and spring lock retainer of FIG. 4 after the spring lock retainer stops are formed according to some embodiments.

FIGS. 3-5 illustrate a sequence in the proves of installing the spring lock retainer 110 in the connector housing 108 As shown in FIG. 3, a cavity 120 in the connector housing 108 has a forward annular ridge 122 extending into the cavity 120 from an inner wall 124 of the connector housing 108. The cavity 120 also has a rearward annular ridge 126 extending into the cavity 120 from the inner wall 124. A height of the forward annular ridge is greater than a height of the rearward annular ridge. The inner wall 124 also defines a plurality of spring lock retainer stop grooves 128 that extend to locations rearward of the rearward annular ridge 126 and a pair of locating grooves 130 located opposite one another that extend to locations forward of the rearward annular ridge 126.

As shown in FIG. 4, the spring lock retainer 110 is placed into the cavity 120 such that a forward end 132 of the spring lock retainer 110 is near or in contact with the forward annular ridge 122 and a rearward end 134 of the spring lock retainer 110 is near or in contact with the rearward annular ridge 126 and is flush with forward walls 136 of the pair of locating grooves 130.

Figure 6:
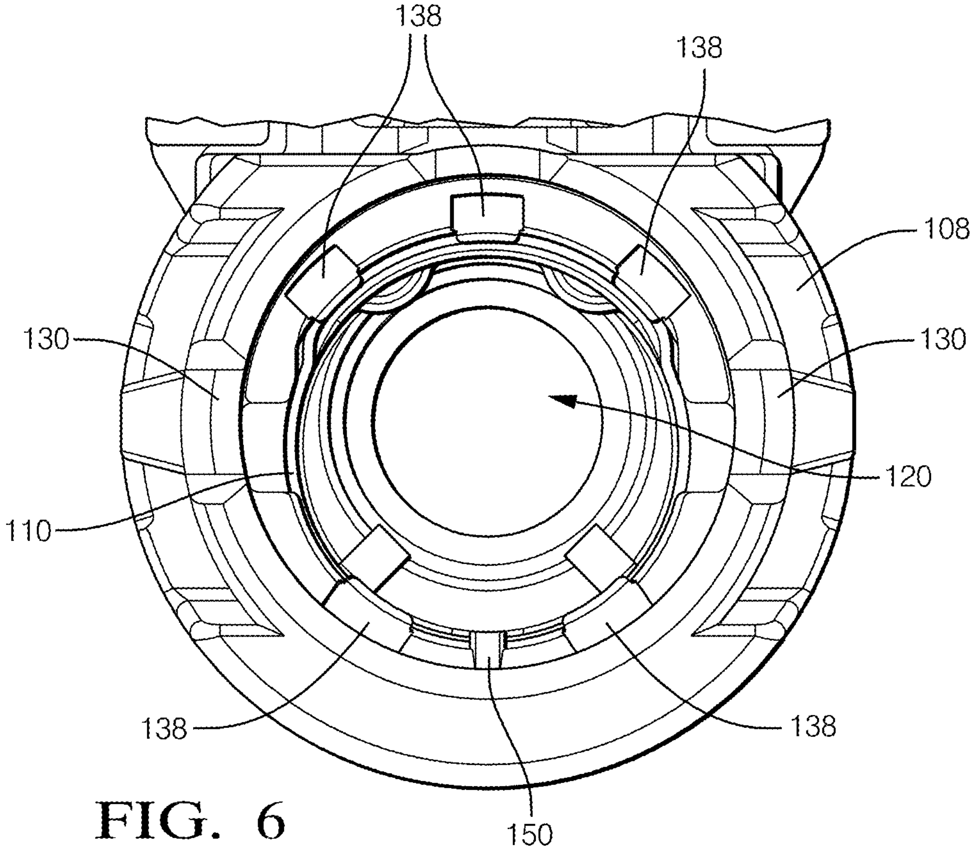
FIG. 6 shows a rear view of the connector housing without the cable and terminal inserted within a cavity according to some embodiments.
Figure 7:
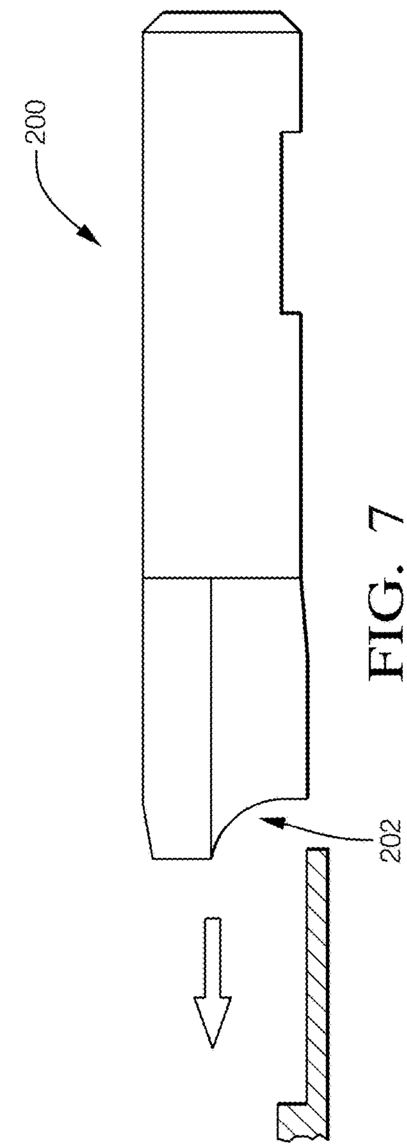
FIG. 7 shows a side view of a tool for forming the spring lock retainer stops according to some embodiments.

As shown in FIGS. 5 and 6, a plurality of a plurality of spring lock retainer stops 138 are formed. The plurality of spring lock retainer stops 138 extend form the inner wall 124 into the cavity 120 and are arranged around a circumference of the rearward end 134 of the spring lock retainer 110. The spring lock retainer stops are formed using a cold forming process that deforms the material of the connector housing in the areas of the a forward ends of the spring lock retainer stop grooves 128 and portions of the rearward annular ridge 126 so that they form the spring lock retainer stops 138. As used herein, a cold forming process is performed at temperatures near normal ambient temperature, i.e., between about 20° C. to 25° C. The spring lock retainer stops 138 may be formed using a spring lock retainer stop forming tool 200, see FIG. 7, having a concave cutting edge 202 that digs into the material of the spring lock retainer stop grooves 128 and the rearward annular ridge 126 and curls it outwardly to form the spring lock retainer stops 138. About 0.5 mm to 1 mm of the material of the spring lock retainer stop grooves 128 and the rearward annular ridge 126 is deformed to form the spring lock retainer stops 138.

Figure 8B:
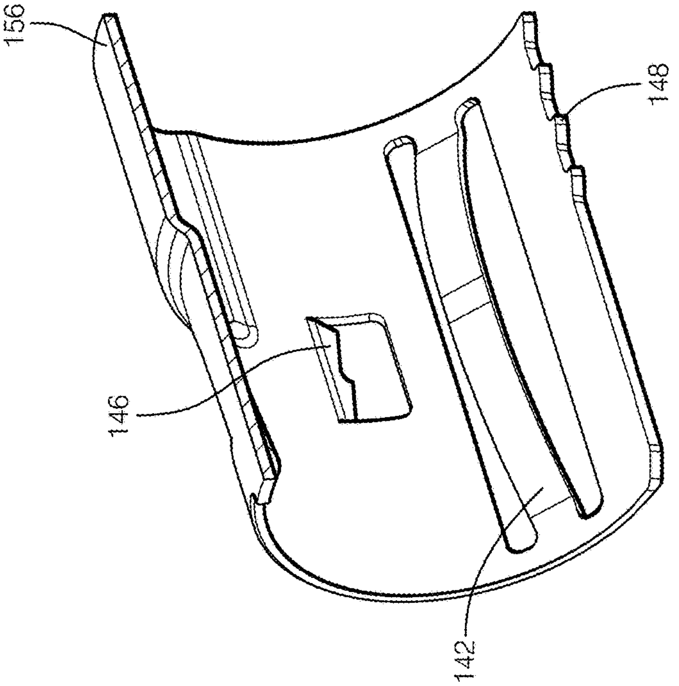
FIG. 8B shows a cross-section view of the spring lock retainer along section line 8B-8B of FIG. 8A according to some embodiments.
Figure 8A:
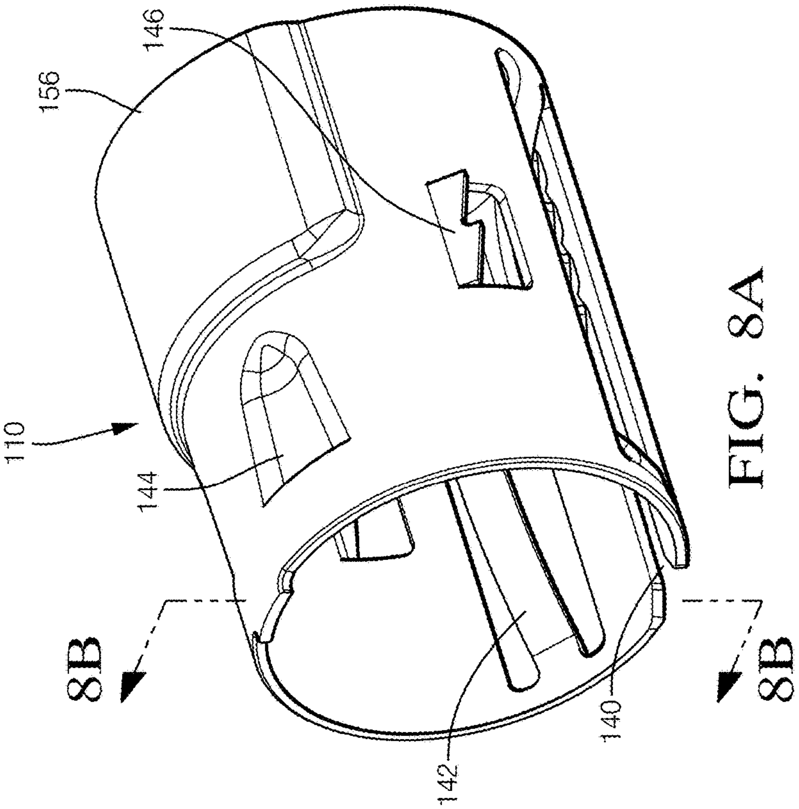
FIG. 8A shows a perspective view of a spring lock retainer inside of the electrical connector according to some embodiments.
Figure 9:
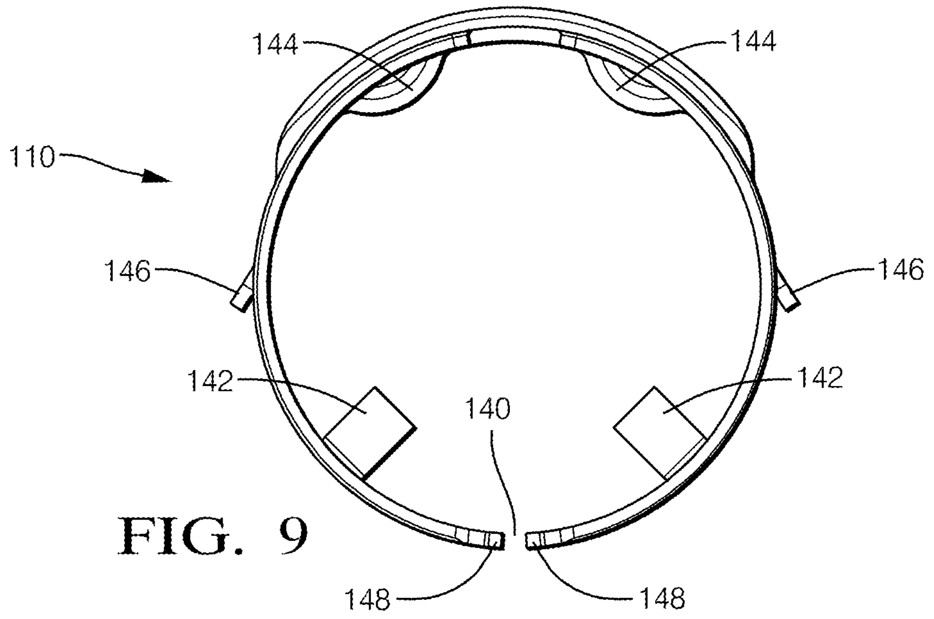
FIG. 9 shows a rear view of the spring lock retainer according to some embodiments.
Figure 10:
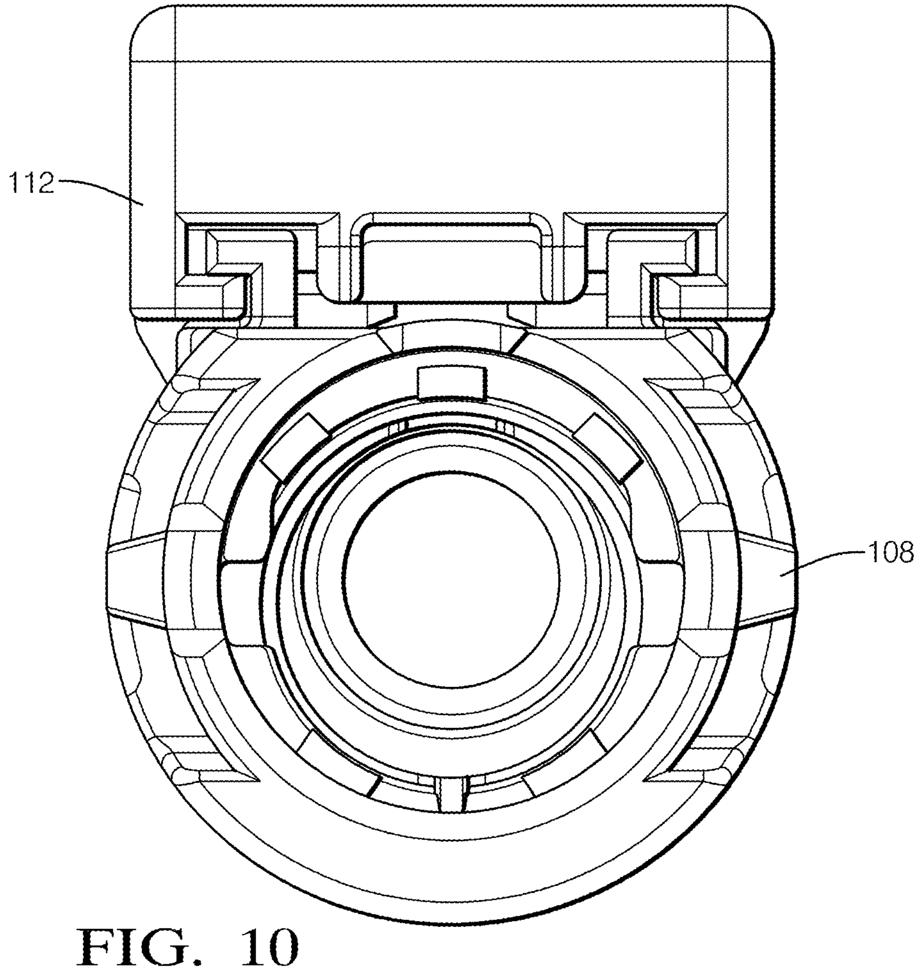
FIG. 10 shows a front view of the connector housing without the cable and terminal inserted within a cavity according to some embodiments.

FIGS. 8A, 8B, and 9 illustrate the features of the spring lock retainer 110. The spring lock retainer 110 has a generally cylindrical shape with a longitudinal slot 140 extending the length of the spring lock retainer 110. The spring lock retainer 110 may be formed from a flat metal sheet and rolled to form the desired shape. The spring lock retainer 110 further includes a pair of spring members 142 extending into the spring lock retainer 110 that are configured to push the terminal 102 into engagement with terminal locks 144 that also extend into the spring lock retainer 110. The spring lock retainer also defines a pair of retention barbs 146 that extend outwardly from the spring lock retainer 110 and are configured to be in an interference fit with the inner walls 124.

Edges of the slot define a plurality of barbs 148 that are in an interference fit with a longitudinal alignment ridge 150 extending from the inner walls, best shown in FIG. 6. This alignment ridge 150 is configured to properly orient the spring lock retainer 110 so that the spring members 142 and terminal locks 144 properly locate the terminal 102 within the cavity 120. While the spring members illustrated here are configured as leaf springs, other embodiments of the spring members 142 may be envisioned using other spring types, e.g., cantilevered springs.

Figure 11:
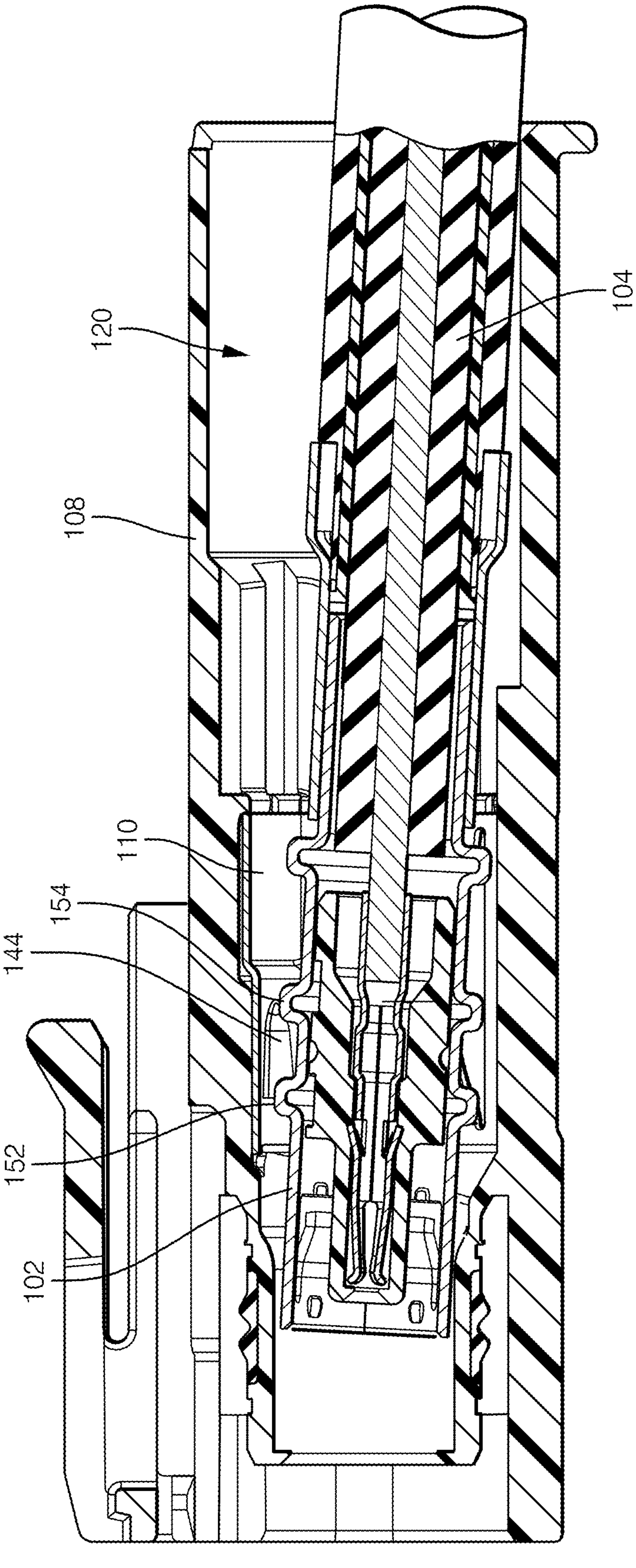
FIG. 11 shows a cross-section view of the electrical connector as a terminated cable is inserted within the connector housing according to some embodiments.
Figure 12:
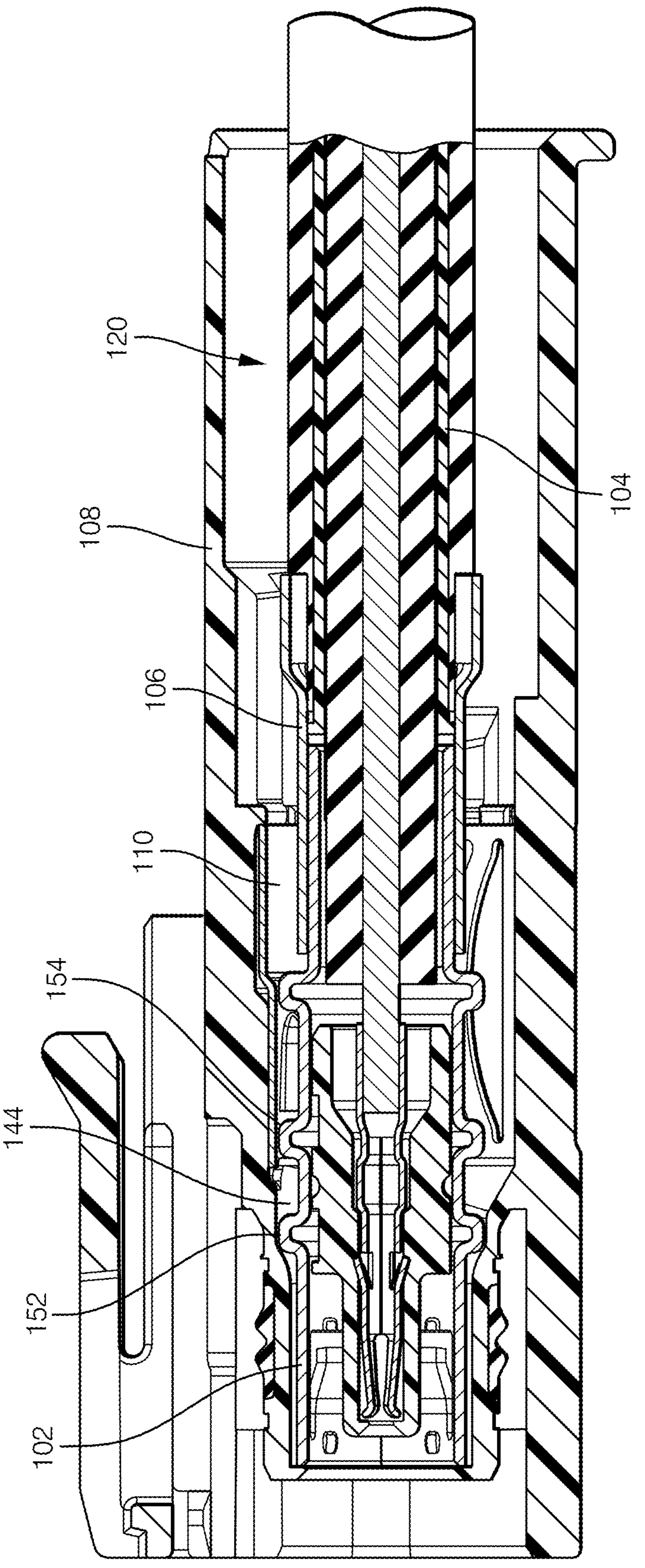
FIG. 12 shows a cross-section view of the electrical connector after the terminated cable is inserted within the connector according to some embodiments.
Figure 13:
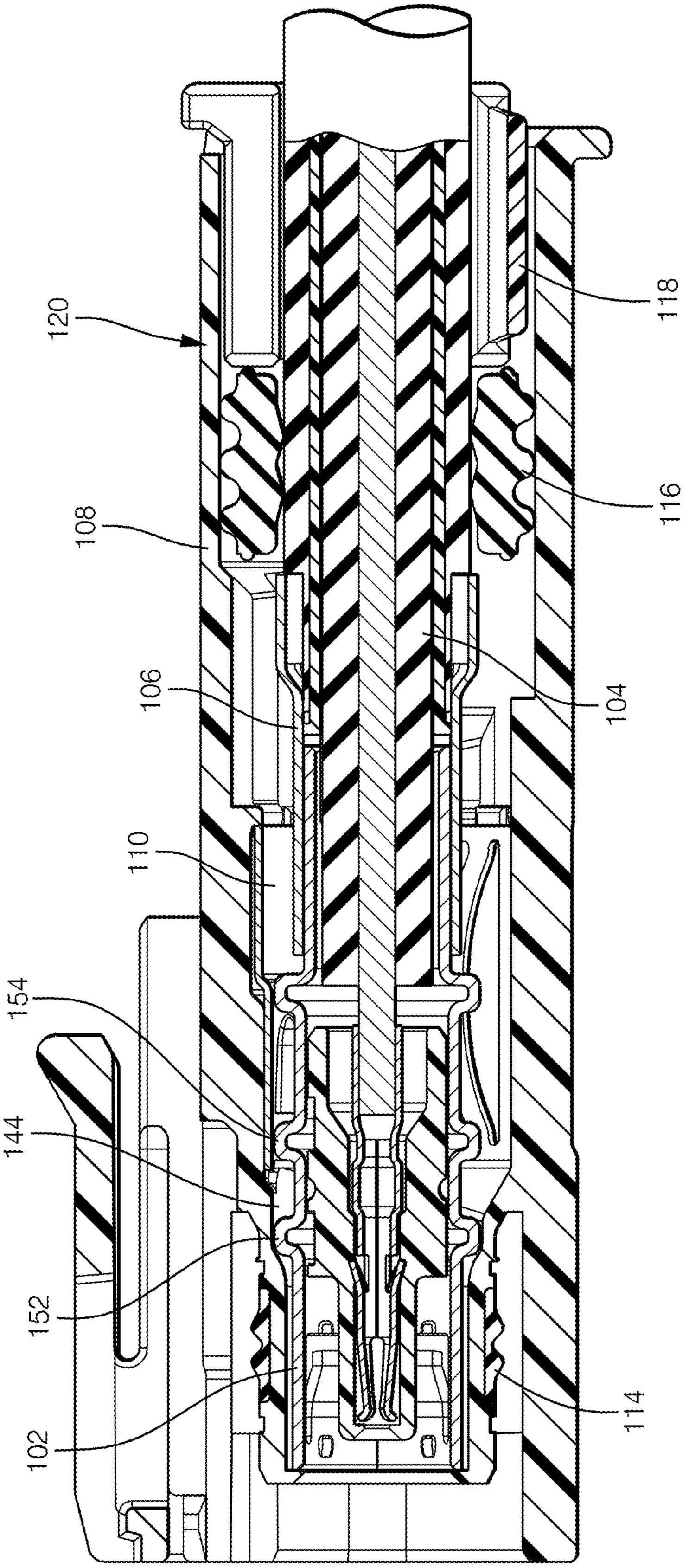
FIG. 13 shows a cross-section view of the electrical connector after a seal and seal retainer are inserted within the connector according to some embodiments.

FIGS. 11-13 illustrate a sequence of steps for inserting the terminal 102 within the spring lock retainer 110. As shown in FIG. 11, an assembly of the terminal 102, ferrule 106, and cable 104 is rotated downwardly so that the terminal 102 compresses the spring members 142, allowing a first ridge 152 on the terminal 102 to pass under the terminal locks 144. As shown in FIG. 12, the assembly of the terminal 102, ferrule 106, and cable 104 is pushed forward until the first ridge 152 clears the terminal locks 144 and the spring members 142 push the coaxial terminal upwardly so that the terminal locks 144 are captured between the first ridge 152 and a second ridge 154 on the terminal 102, thereby properly locating the coaxial terminal longitudinally and axially within the connector 100. As shown in FIG. 13, the cable seal 116 and seal retainer 118 are installed within the connector housing 108. The cable seal 116 and seal retainer 118 cooperate to maintain a parallel arrangement of the terminal 102 and cable 104 with a longitudinal axis of the spring lock retainer 110 and the connector housing 108, thereby maintaining engagement of the terminal locks 144 with the terminal 102.

Figure 14:
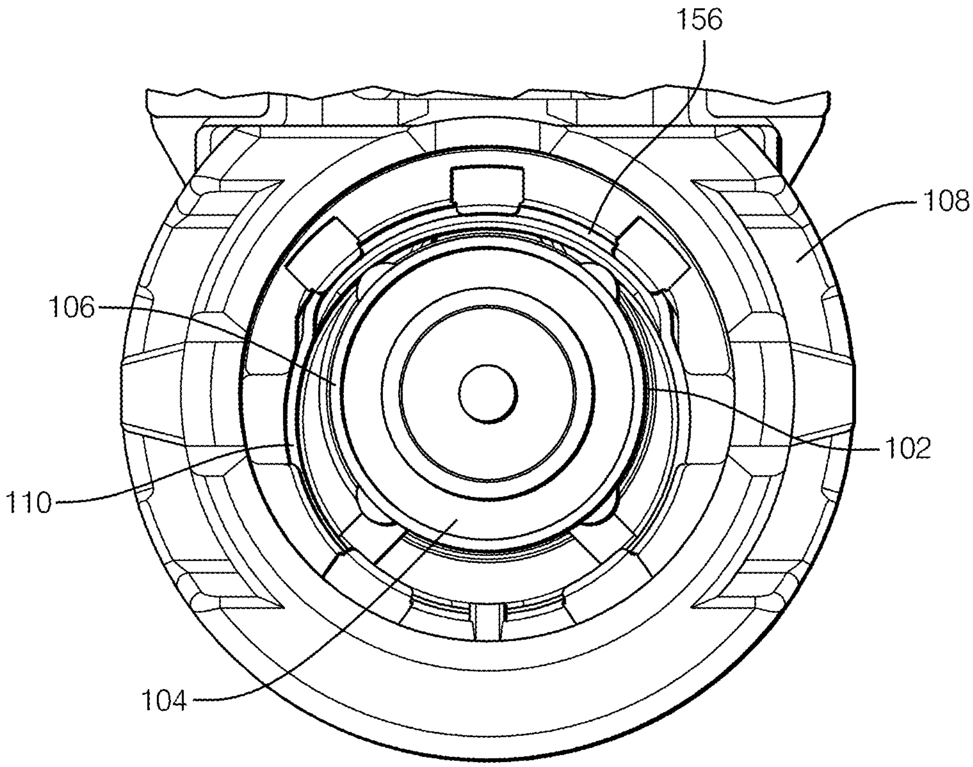
FIG. 14 shows an end view of the electrical connector of FIG. 1 after the terminated cable is inserted within the connector according to some embodiments.

The spring lock retainer 110 also defines an embossed area 156 on an upper surface of the rearward portion of the spring lock retainer 110 that is configured to accommodate the ferrule 106 when the terminal 102 is inserted within the spring lock retainer 110 as best shown in FIG. 14.

Figure 15:
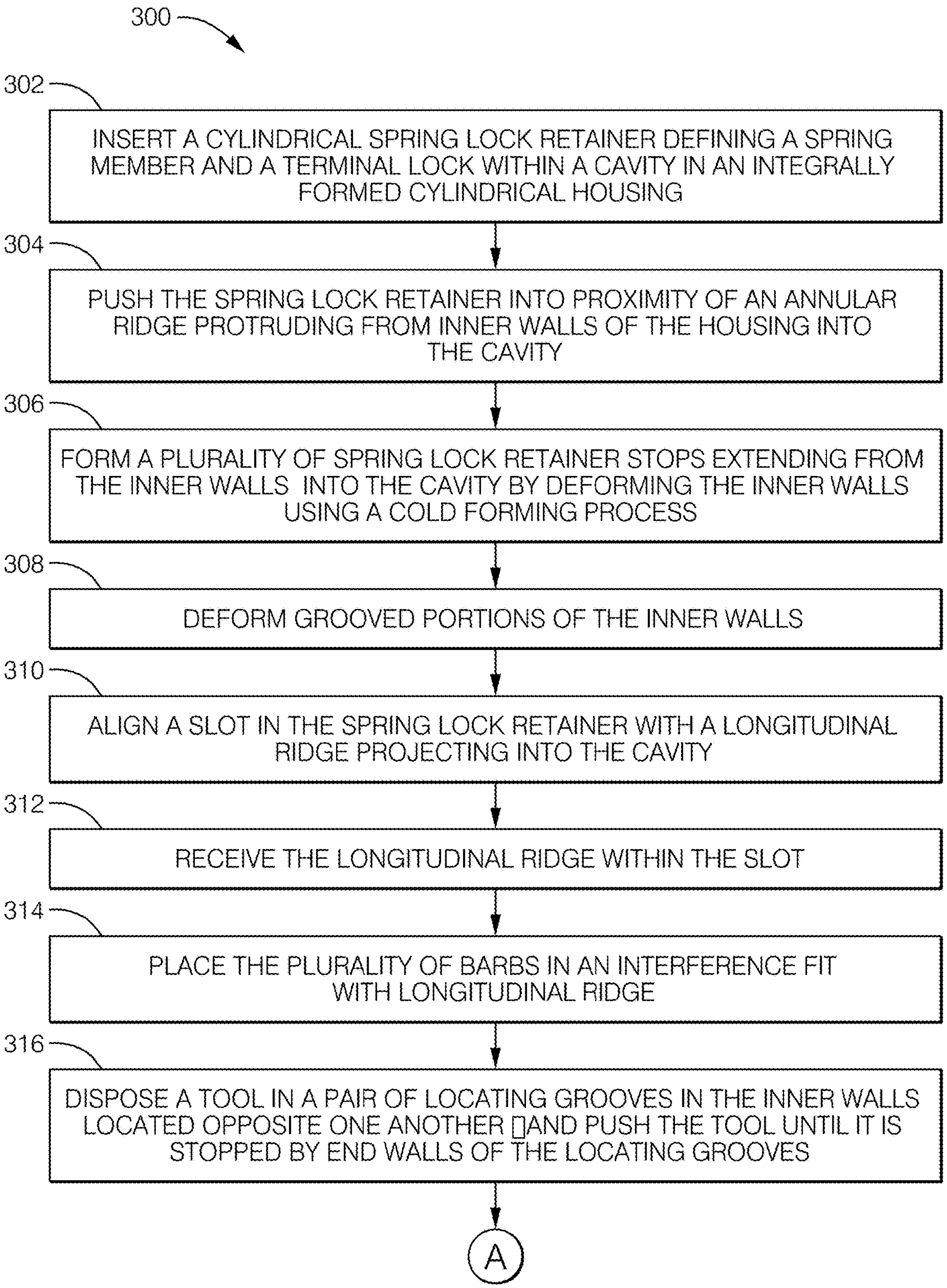
FIG. 15 shows a flow chart of a method of manufacturing an electrical connector according to some embodiments.
Figure 15:
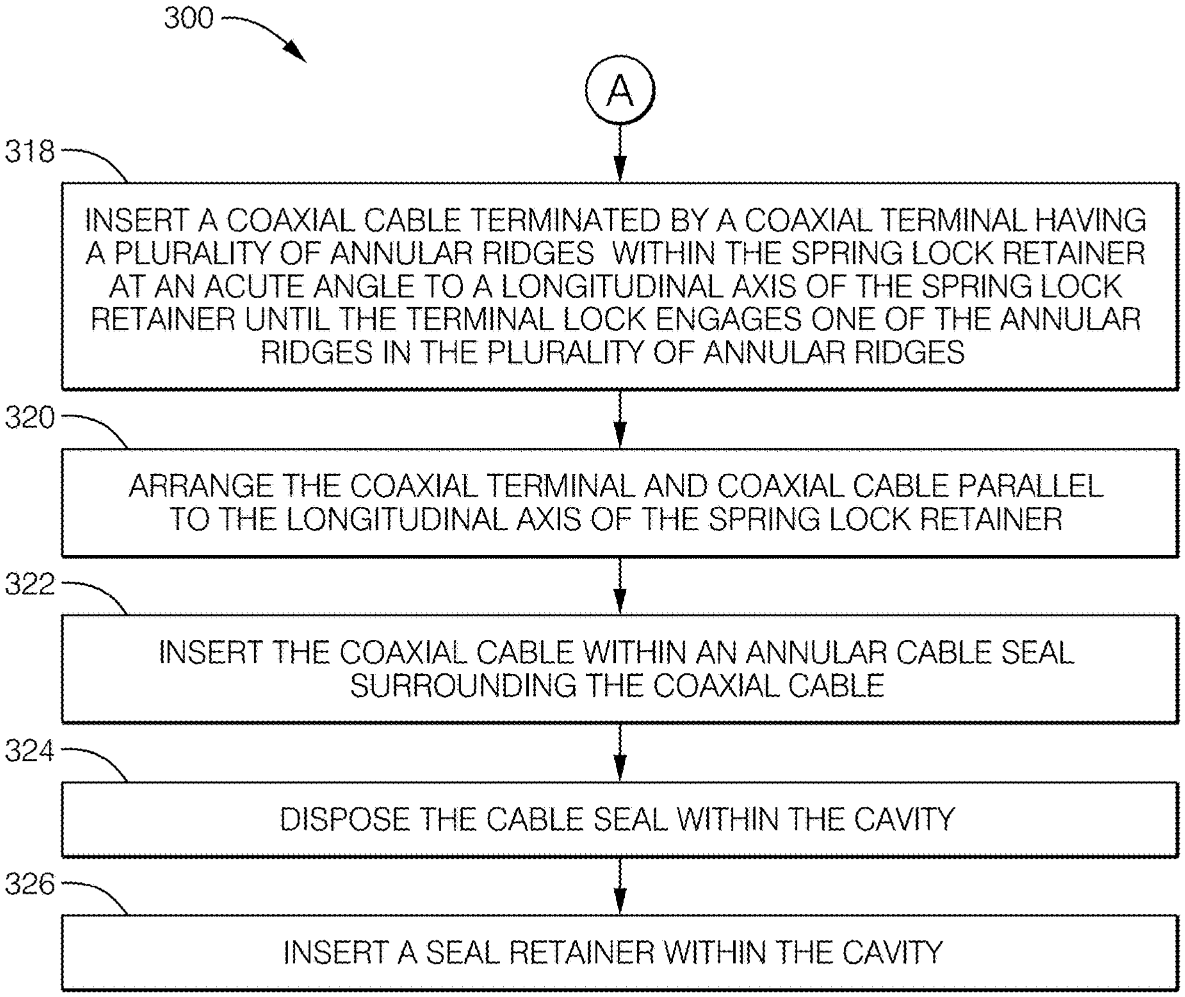

FIG. 15 illustrates a method 300 of manufacturing a coaxial electrical connector such as those described above.

STEP 302, INSERT A CYLINDRICAL SPRING LOCK RETAINER DEFINING A SPRING MEMBER AND A TERMINAL LOCK WITHIN A CAVITY IN AN INTEGRALLY FORMED CYLINDRICAL HOUSING, includes inserting a cylindrical spring lock retainer 110 defining a spring member 142 and a terminal lock 144 within a cavity 120 in an integrally formed cylindrical connector housing 108;

STEP 304, PUSH THE SPRING LOCK RETAINER INTO PROXIMITY OF AN ANNULAR RIDGE PROTRUDING FROM INNER WALLS OF THE HOUSING INTO THE CAVITY, includes pushing the spring lock retainer 110 into proximity of an annular ridge 122 protruding from inner walls 124 of the connector housing 108 into the cavity 120;

STEP 306, FORM A PLURALITY OF SPRING LOCK RETAINER STOPS EXTENDING FROM THE INNER WALLS INTO THE CAVITY BY DEFORMING THE INNER WALLS USING A COLD FORMING PROCESS, includes forming a plurality of spring lock retainer stops 138 extending from the inner walls 124 into the cavity 120 by deforming the inner walls 124 using a cold forming process;

STEP 308, DEFORM GROOVED PORTIONS OF THE INNER WALLS, which may coincide with STEP 306 includes deforming the spring lock retainer stop grooves 128 defined in the inner walls 124;

STEP 310, ALIGN A SLOT IN THE SPRING LOCK RETAINER WITH A LONGITUDINAL RIDGE PROJECTING INTO THE CAVITY, includes aligning a slot 140 in the spring lock retainer 110 with a longitudinal ridge 150 projecting into the cavity 120;

STEP 312, RECEIVE THE LONGITUDINAL RIDGE WITHIN THE SLOT, which may coincide with STEP 304, includes receiving the longitudinal ridge 150 within the slot 140;

STEP 314, PLACE THE PLURALITY OF BARBS IN AN INTERFERENCE FIT WITH LONGITUDINAL RIDGE, which may coincide with STEP 304, includes placing the plurality of barbs 148 in an interference fit with longitudinal ridge 150;

STEP 316, DISPOSE A TOOL IN A PAIR OF LOCATING GROOVES IN THE INNER WALLS LOCATED OPPOSITE ONE ANOTHER AND PUSH THE TOOL UNTIL IT IS STOPPED BY END WALLS OF THE LOCATING GROOVES, which may coincide with STEP 304, includes disposing a tool in a pair of locating grooves 130 in the inner walls 124 located opposite one another and pushing the tool until it is stopped by end walls of the locating grooves 130;

STEP 318, INSERT A COAXIAL CABLE TERMINATED BY A COAXIAL TERMINAL HAVING A PLURALITY OF ANNULAR RIDGES WITHIN THE SPRING LOCK RETAINER AT AN ACUTE ANGLE TO A LONGITUDINAL AXIS OF THE SPRING

LOCK RETAINER UNTIL THE TERMINAL LOCK ENGAGES ONE OF THE ANNULAR RIDGES IN THE PLURALITY OF ANNULAR RIDGES, which may be performed subsequent to STEP 306, includes inserting a coaxial cable 104 terminated by a coaxial terminal 102 having a plurality of annular ridges 152, 154 within the spring lock retainer 110 at an acute angle to a longitudinal axis of the spring lock retainer 110 until the terminal lock 144 engages one of the annular ridges 152 in the plurality of annular ridges 152, 154;

STEP 320, ARRANGE THE COAXIAL TERMINAL AND COAXIAL CABLE PARALLEL TO THE LONGITUDINAL AXIS OF THE SPRING LOCK RETAINER, which may be performed subsequent to STEP 318, includes arranging the coaxial terminal 102 and coaxial cable 104 parallel to the longitudinal axis of the spring lock retainer 110;

STEP 322, INSERT THE COAXIAL CABLE WITHIN AN ANNULAR CABLE SEAL SURROUNDING THE COAXIAL CABLE, which may be performed subsequent to STEP 320, includes inserting the coaxial cable 104 within an annular cable seal 116 surrounding the coaxial cable 104;

STEP 324, DISPOSE THE CABLE SEAL WITHIN THE CAVITY, which may be performed subsequent to STEP 322, includes disposing the cable seal 116 within the cavity 120; and STEP 326, INSERT A SEAL RETAINER WITHIN THE CAVITY, which may be performed subsequent to STEP 324, includes inserting a seal retainer 118 within the cavity 120.

While the examples presented above are directed to coaxial electrical connectors, alternative embodiments may be envisioned for other types of electrical terminals and electrical cables.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A coaxial electrical connector, comprising:

an integrally formed cylindrical housing;

a cylindrical spring lock retainer disposed within a cavity in the housing and defining a spring member, and a terminal lock, and a plurality of retention barbs that extend outwardly from the spring lock retainer and are configured to be in an interference fit with inner walls of the housing;

an annular ridge protruding from the inner walls of the housing into the cavity; and a plurality of spring lock retainer stops extending from the inner walls into the cavity and arranged around a circumference of the spring lock retainer, wherein the annular ridge is arranged on a first end of the spring lock retainer and the plurality of spring lock retainer stops are arranged on a second end of the spring lock retainer opposite the first end.

2. The coaxial electrical connector in accordance with claim 1, further comprising a pair of locating grooves in the inner walls located opposite one another and configured to allow a tool to push the spring lock retainer into proximity with the annular ridge.

3. The coaxial electrical connector in accordance with claim 1, wherein the plurality of spring lock retainer stops is cold formed by deforming grooved portions of the inner walls.

4. The coaxial electrical connector in accordance with claim 3, wherein the housing is formed of a cold formable polymer material.

5. The coaxial electrical connector in accordance with claim 1, wherein the inner walls define a longitudinal ridge that is received within a slot in the spring lock retainer.

6. The coaxial electrical connector in accordance with claim 5, wherein edges of the slot define a plurality of barbs in an interference fit with the longitudinal ridge.

7. The coaxial electrical connector in accordance with claim 1, further comprising:

a coaxial cable terminated by a coaxial terminal having a plurality of annular ridges received within the spring lock retainer, wherein the terminal lock engages one of the annular ridges in the plurality of annular ridges and wherein the spring member and the terminal lock cooperate to retain a terminal within the cavity.

8. The coaxial electrical connector in accordance with claim 7, further comprising:

an annular cable seal surrounding the coaxial cable and disposed within the cavity; and a seal retainer disposed within the cavity, wherein the cable seal and the seal retainer cooperate to maintain engagement of the terminal lock with the one of the annular ridges in the plurality of annular ridges.

9. A coaxial electrical connector, comprising:

an integrally formed cylindrical housing;

a cylindrical spring lock retainer disposed within a cavity in the housing and defining a spring member and a terminal lock;

a first annular ridge protruding from inner walls of the housing into the cavity;

a second annular ridge protruding from the inner walls of the housing into the cavity that is arranged on the second end of the spring lock retainer, a height of the second annular ridge being less than a height of the first annular ridge; and a plurality of spring lock retainer stops extending from the inner walls into the cavity and arranged around a circumference of the spring lock retainer, wherein the annular ridge is arranged on a first end of the spring lock retainer and the plurality of spring lock retainer stops are arranged on a second end of the spring lock retainer opposite the first end.

10. A method of manufacturing a coaxial electrical connector, comprising:

inserting a cylindrical spring lock retainer defining a spring member, a terminal lock, and a plurality of retention barbs that extend outwardly from the spring lock retainer within a cavity in an integrally formed cylindrical housing;

pushing the spring lock retainer into proximity of an annular ridge protruding from inner walls of the housing into the cavity;

placing the plurality of retention barbs in an interference fit with the inner walls as the spring lock retainer is pushed into proximity of the annular ridge; and forming a plurality of spring lock retainer stops extending from the inner walls into the cavity by deforming the inner walls using a cold forming process, wherein the annular ridge is arranged on a first end of the spring lock retainer and the plurality of spring lock retainer stops are arranged on a second end of the spring lock retainer opposite the first end.

11. The method in accordance with claim 10, wherein forming the plurality of spring lock retainer stops further includes deforming grooved portions of the inner walls.

12. The method in accordance with claim 10, wherein the plurality of spring lock retainer stops are formed in a temperature range of about 20° C. to 25° C.

13. The method in accordance with claim 10, wherein the plurality of spring lock retainer stops is formed by a tool having a concave forming surface.

14. The method in accordance with claim 11, wherein pushing the spring lock retainer into proximity of the annular ridge protruding from inner walls of the housing into the cavity further comprises disposing a tool in a pair of locating grooves in the inner walls located opposite one another and pushing the tool until it is stopped by end walls of the locating grooves, thereby pushing the spring lock retainer into proximity with the annular ridge.

15. The method in accordance with claim 11, further comprising:

aligning a slot in the spring lock retainer with a longitudinal ridge projecting into the cavity; and receiving the longitudinal ridge within the slot as the spring lock retainer is pushed into proximity of the annular ridge.

16. The method in accordance with claim 15, wherein edges of the slot have a plurality of retention barbs, wherein the method further comprises placing the plurality of barbs in an interference fit with the longitudinal ridge as the spring lock retainer is pushed into proximity of the annular ridge.

17. The method in accordance with claim 10, further comprising:

inserting a coaxial cable terminated by a coaxial terminal having a plurality of annular ridges within the spring lock retainer at an acute angle to a longitudinal axis of the spring lock retainer until the terminal lock engages one of the annular ridges in the plurality of annular ridges; and arranging the coaxial terminal and coaxial cable parallel to the longitudinal axis of the spring lock retainer, thereby retaining the terminal within the cavity via cooperation of the terminal lock and the spring member.

18. The method in accordance with claim 17, further comprising:

inserting the coaxial cable within an annular cable seal surrounding the coaxial cable;

disposing the cable seal within the cavity; and inserting a seal retainer within the cavity, wherein the cable seal and seal retainer cooperate to maintain the parallel arrangement of the coaxial terminal and coaxial cable with the longitudinal axis of the spring lock retainer.

* * * * *